United States Patent
Hirsch et al.

(10) Patent No.: US 12,052,447 B1
(45) Date of Patent: Jul. 30, 2024

(54) DYNAMICALLY MOVING TRANSCODING OF CONTENT BETWEEN SERVERS

(71) Applicant: Amazon Technologies, Inc., Seattle, WA (US)

(72) Inventors: Benjamin Hirsch, San Francisco, CA (US); Xiangbo Li, San Diego, CA (US); Selvanayagam Sendurpandian, Livermore, CA (US); Nagendra Akula Akula Suresh Babu, San Jose, CA (US); Rohit Puri, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/850,493

(22) Filed: Jun. 27, 2022

(51) Int. Cl.
  *H04N 21/2343* (2011.01)
  *H04N 21/2187* (2011.01)

(52) U.S. Cl.
  CPC . *H04N 21/234309* (2013.01); *H04N 21/2187* (2013.01)

(58) Field of Classification Search
  CPC .................. H04N 21/234309; H04N 21/2187
  See application file for complete search history.

(56) References Cited

U.S. PATENT DOCUMENTS

| | | |
|---|---|---|
| 5,991,799 A | 11/1999 | Yen et al. |
| 6,981,045 B1 * | 12/2005 | Brooks .............. H04N 21/4143 709/246 |
| 7,299,275 B2 | 11/2007 | Tsukidate et al. |
| 7,337,392 B2 | 2/2008 | Lue |
| 7,369,749 B2 | 5/2008 | Ichioka et al. |
| 7,506,355 B2 | 3/2009 | Ludvig et al. |
| 7,603,683 B2 | 10/2009 | Reto |
| 7,653,921 B2 | 1/2010 | Herley |

(Continued)

FOREIGN PATENT DOCUMENTS

| | | | | |
|---|---|---|---|---|
| CN | 108845882 A | * | 11/2018 | ........... G06F 9/4881 |
| CN | 110213617 A | * | 9/2019 | ......... H04N 21/2343 |

(Continued)

OTHER PUBLICATIONS

U.S. Appl. No. 17/855,361, "Systems and Methods for Switching the Processing of a Live Content Stream To Another Datacenter" filed Jun. 30, 2022.

*Primary Examiner* — James R Sheleheda
(74) *Attorney, Agent, or Firm* — Kilpatrick Townsend & Stockton LLP

(57) ABSTRACT

Dynamically re-locating transcoding processes of live content data is described herein. In an example, a computer system causes a first server to execute a first transcode process on a first portion of live stream content. A first output of executing the first transcode process includes first transcoded content. The computer system determines a transcode capacity of one or more servers. The computer system determines that transcoding the live stream content is to be moved to a second server based at least in part on the transcode capacity and a transcode optimization parameter. The computer system causes the second server to execute a second transcode process on a second portion of the live stream content. The second transcode process is equivalent to the first transcode process. A second output of executing the second transcode process includes second transcoded content.

20 Claims, 9 Drawing Sheets

(56) References Cited

U.S. PATENT DOCUMENTS

| | | |
|---|---|---|
| 7,712,125 B2 | 5/2010 | Herigstad et al. |
| 7,734,579 B2 | 6/2010 | White et al. |
| 7,849,207 B2 | 12/2010 | Kazmi et al. |
| 7,908,625 B2 | 3/2011 | Robertson et al. |
| 8,307,395 B2 | 11/2012 | Issa et al. |
| 8,607,091 B2 * | 12/2013 | Asbun ................ H04N 21/6375 |
| | | 714/4.1 |
| 8,813,149 B2 | 8/2014 | Marignan et al. |
| 8,839,295 B2 | 9/2014 | Kim |
| 10,277,924 B1 | 4/2019 | Stewart et al. |
| 10,310,928 B1 * | 6/2019 | Hegar .................... G06F 3/0635 |
| 10,313,710 B1 | 6/2019 | Karlsson et al. |
| 10,454,985 B2 | 10/2019 | Stockhammer et al. |
| 10,979,477 B1 | 4/2021 | Cabrido et al. |
| 11,108,840 B2 | 8/2021 | Shi et al. |
| 11,412,278 B1 | 8/2022 | Robinson et al. |
| 2003/0061206 A1 | 3/2003 | Qian |
| 2003/0063217 A1 | 4/2003 | Smith |
| 2003/0137947 A1 * | 7/2003 | Roy .................... H04L 65/1101 |
| | | 370/310 |
| 2003/0162503 A1 * | 8/2003 | LeCren ............... G06F 11/2038 |
| | | 455/452.2 |
| 2004/0103426 A1 | 5/2004 | Ludvig et al. |
| 2004/0148571 A1 | 7/2004 | Lue |
| 2004/0215718 A1 | 10/2004 | Kazmi et al. |
| 2005/0005025 A1 * | 1/2005 | Harville ................ H04L 65/612 |
| | | 709/241 |
| 2005/0066352 A1 | 3/2005 | Herley |
| 2005/0144455 A1 | 6/2005 | Haitsma |
| 2005/0262542 A1 | 11/2005 | DeWeese et al. |
| 2006/0031883 A1 | 2/2006 | Ellis et al. |
| 2006/0031889 A1 | 2/2006 | Bennett et al. |
| 2006/0190966 A1 | 8/2006 | McKissick et al. |
| 2007/0124756 A1 | 5/2007 | Covell et al. |
| 2007/0157281 A1 | 7/2007 | Ellis et al. |
| 2007/0226365 A1 * | 9/2007 | Hildreth ............... G11B 27/034 |
| | | 375/E7.198 |
| 2008/0027953 A1 | 1/2008 | Morita et al. |
| 2008/0059532 A1 | 3/2008 | Kazmi et al. |
| 2008/0060036 A1 | 3/2008 | Cox |
| 2008/0109477 A1 | 5/2008 | Lue |
| 2008/0133701 A1 | 6/2008 | Kazmi et al. |
| 2008/0215170 A1 | 9/2008 | Milbrandt et al. |
| 2008/0235733 A1 | 9/2008 | Heie et al. |
| 2009/0037954 A1 | 2/2009 | Nagano |
| 2009/0119708 A1 | 5/2009 | Harrar et al. |
| 2009/0320058 A1 | 12/2009 | Wehmeyer et al. |
| 2009/0320072 A1 | 12/2009 | McClanahan et al. |
| 2009/0320073 A1 | 12/2009 | Reisman |
| 2010/0121936 A1 | 5/2010 | Liu et al. |
| 2010/0131385 A1 | 5/2010 | Harrang et al. |
| 2010/0251292 A1 | 9/2010 | Srinivasan et al. |
| 2010/0296487 A1 | 11/2010 | Karaoguz et al. |
| 2011/0066744 A1 | 3/2011 | Del et al. |
| 2011/0068899 A1 | 3/2011 | Toffe et al. |
| 2011/0086619 A1 | 4/2011 | George et al. |
| 2011/0138064 A1 | 6/2011 | Rieger et al. |
| 2011/0191439 A1 | 8/2011 | Dazzi et al. |
| 2011/0191446 A1 | 8/2011 | Dazzi et al. |
| 2012/0072961 A1 | 3/2012 | Marignan et al. |
| 2012/0117590 A1 | 5/2012 | Agnihotri et al. |
| 2012/0278725 A1 | 11/2012 | Gordon et al. |
| 2012/0291079 A1 | 11/2012 | Gordon et al. |
| 2013/0054827 A1 * | 2/2013 | Feher .................... H04L 65/765 |
| | | 709/231 |
| 2013/0117418 A1 * | 5/2013 | Mutton .................... H04L 65/75 |
| | | 709/219 |
| 2013/0223811 A1 * | 8/2013 | Shanmukhadas ........ H04N 5/85 |
| | | 386/E5.069 |
| 2013/0308436 A1 * | 11/2013 | Li .................... H04N 21/234309 |
| | | 370/216 |
| 2014/0181834 A1 * | 6/2014 | Lim ....................... G06F 9/5088 |
| | | 718/105 |
| 2015/0244757 A1 * | 8/2015 | Zhuang ................ G06F 9/5066 |
| | | 709/219 |
| 2015/0341407 A1 * | 11/2015 | Agnoli .................... H04L 67/565 |
| | | 709/219 |
| 2016/0036693 A1 * | 2/2016 | Galdy .............. H04N 21/23439 |
| | | 709/219 |
| 2018/0302452 A1 * | 10/2018 | Pantos .................... H04L 67/02 |
| 2019/0109883 A1 * | 4/2019 | Sugunan ................ H04L 65/80 |
| 2019/0149859 A1 * | 5/2019 | George ............. H04N 21/8547 |
| | | 725/148 |
| 2019/0327496 A1 * | 10/2019 | Lin ................ H04N 21/234363 |
| 2020/0358835 A1 * | 11/2020 | Cenzano Ferret .... H04L 65/765 |
| 2020/0382803 A1 * | 12/2020 | Zhang .................... H04N 19/40 |
| 2021/0195264 A1 | 6/2021 | Shi et al. |
| 2021/0211484 A1 | 7/2021 | Sodagar |
| 2021/0281621 A1 | 9/2021 | Sodagar |
| 2021/0400081 A1 * | 12/2021 | van der Mandele ........................ |
| | | H04L 63/1416 |
| 2022/0217190 A1 | 7/2022 | Sodagar |
| 2022/0217194 A1 | 7/2022 | Sodagar |
| 2022/0248296 A1 * | 8/2022 | Merwaday ............ H04W 36/30 |

FOREIGN PATENT DOCUMENTS

| | | | |
|---|---|---|---|
| CN | 114679592 A | * | 6/2022 |
| CN | 115426503 A | * | 12/2022 |

* cited by examiner

DYNAMICALLY MOVING TRANSCODING OF CONTENT BETWEEN SERVERS

BACKGROUND

Over the past few years, video streaming has become increasingly widespread. In many streaming environments, video may be sent from a source to a recipient via an intermediary, such as an intermediary video streaming service. One common example in which this may occur relates to video game streaming. For example, a video game player may sometimes operate a system to capture video of themself playing a video game, such as using video capture software. The system may then transmit this video to a video streaming service, which, in turn, may transmit the video to recipient devices corresponding to viewers. In these and other scenarios, the intermediary (e.g., video streaming service) may often transcode the video content. In a transcoding process, video may be decoded from a first format and then re-encoded into a different format.

BRIEF DESCRIPTION OF THE DRAWINGS

Various embodiments in accordance with the present disclosure will be described with reference to the drawings, in which.

DETAILED DESCRIPTION

Figure 1:
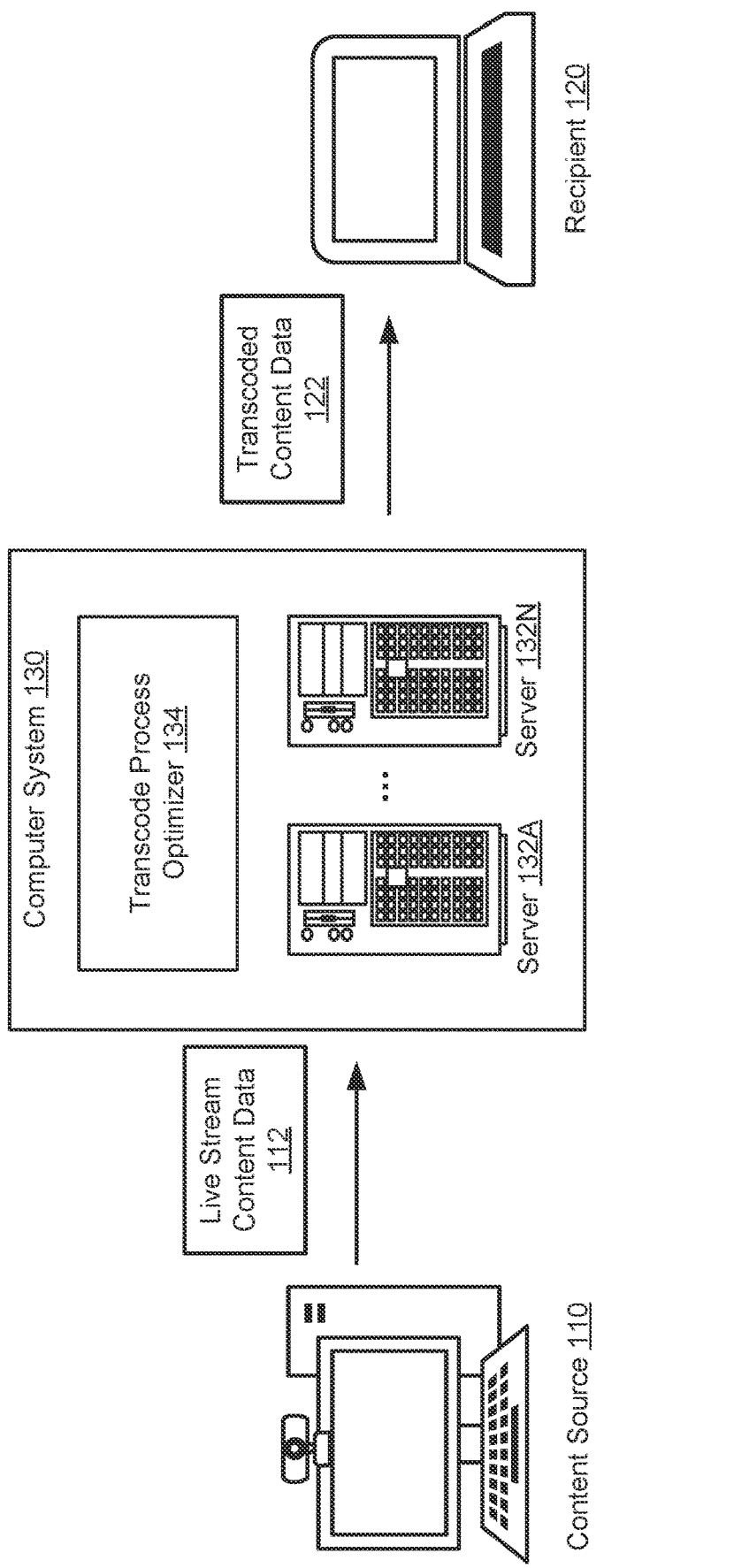
FIG. 1 illustrates an example of an overall context of dynamically re-locating a transcoding process of live content data according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, transcoding live content data. In an example, a computer system receives live stream content from a content source. For example, a person may operate a computer to capture content (e.g., audio/video) of themself, such as using content capture software. The person may also operate the computer to then transmit this content as live content data to a content streaming service. In this case, the computer may be considered as the content source. The content streaming service may, in turn, process the received content data and transmit the processed content data to a number of recipients. A recipient can be any device or computing service (e.g., an online computing service) configured to receive the transmitted content data (e.g., configured as a destination of the content streaming service). The transmitted content data can be sent in real-time or near-real time relative to when the original content data is generated by the computer or received by the content streaming service (e.g., the timing between the original data is available and when the processed data is transmitted may be equal to the processing time needed for the processing). The processing may include transcoding by at least decoding the received content data from a first format and then re-encoding it into a different format. The process of transcoding the content data may be performed by transcode servers, which may generate transcoded content segments and playlists that correspond to the transcoded content segments. The playlists may be provided to content players (e.g., executing on the recipients) and may be used by the content players to request the transcoded content segments. The content players may then request and receive the transcoded content segments and then play the content in a live manner (e.g., in real-time or near-real time).

During the transcoding process, the computer system may cause a first server to execute a first transcode process on a first portion of the live stream content. The first transcode process can generate a first output of first transcoded content, which can be sent to a recipient that has requested the live stream content during a live stream. As the first server executes the first transcode process, the computer system can determine a transcode capacity of the plurality of servers. Based on the transcode capacity and a transcode optimization parameter, the computer system can determine that transcoding the live stream content is to be moved to a second server. The computer system can then cause the second server to execute a second transcode process on a second portion of the live stream content to generate second transcoded content. The computer system can also cause the first server to stop executing the first transcode process based on the second transcode process being executed. The second transcoded content is sent to the recipient as part of the live stream.

To illustrate, consider an example of a video streaming service that transcodes live streams of video game player playing video games. As live steam content of the video game is captured, the video streaming service receives the live stream content. To reduce latency associated with providing the live stream content to recipients, a first server can initially begin transcoding the video game content based on properties (e.g., resolution, bitrate, etc.) of the video game content and of properties (resolution, frame rate, definition, platform, etc.) of the transcoding. This transcoding may be referred to as a first transcoding process. Once the video streaming service determines that the first server has transcoded the video game content for a certain period of time, the video streaming service can determine the transcode capacity of the first server, as well as the transcode capacities of other servers of the video streaming service. Based on the transcode capacity of the servers, the video streaming service may determine that the transcoding of the video game content is to be moved to a second server. In this case, the second server can execute a second transcoding process to continue transcoding the next part of the received live stream content, whereas the first server can stop the execution of the first transcoding process. The video streaming service may also determine movement of transcoding processes for multiple live streams across the servers. For instance, the video streaming service may consider the transcode capacity across all of the servers, or a subset of servers, as well as the properties for all of the live stream content and the transcoding processes to determine how to optimally move the transcoding processes between the servers. The video streaming service can then cause the movement by instructing the various servers as applicable. Moving a transcoding process from a current server to a next one can involve instructing the next server to start a new transcoding process and instructing the current server to stop execution of the existing transcoding process. The instructions can be sent in parallel and/or the next server can be instructed first and, once the new transcoding process starts, the current server can be instructed.

Embodiments of the present disclosure provide several technical advantages over conventional transcoding techniques. For instance, conventional transcoding techniques may cause a disruption to playback when moving transcoding processes between servers. The disruption may occur as a result of the current transcode server (e.g., the transcode server from which the transmission is being switched) and the new transcode server (e.g., the transcode server to which the transmission is being switched) not being synchronized. In addition, conventional transcoding techniques may arbitrarily assign transcoding processes to servers, which can lead to sub-optimal packing of transcode processes to the resources available at the servers. Determining optimal movement for each transcode process of a video streaming service may be computationally and time intensive. So, aspects of the present disclosure involve an optimization process for moving transcode processes that can be performed on a single transcode process, all transcode processes on a particular server, a subset of transcode processes across multiple servers, or all transcode processes across all servers. Further, when live stream content is initially received, it can be allocated to a server based on the availability of the server. This initial allocation can result in reducing the time latency associated with transcoding the live stream content and making it available to recipients. Thereafter, a local optimization can be performed specific to this transcode process to optimally move it, as needed, to another server. Depending on a number of triggers, a global optimization can also be performed across the full set or a subset of transcode servers. In this way, optimal usage of transcode resources can be achieved.

In the interest of clarity of explanation, various embodiments are described herein in connection with video. Video is one type of content. The embodiments of the present disclosure are not limited to video only. Instead, the embodiments similarly apply to other types of content, such as audio content, multimedia content, virtual content, augmented reality content, and the like. Further, the embodiments are described in connection with live video.

FIG. 1 illustrates an example of an overall context of dynamically re-locating a transcoding process of live content data according to some embodiments. A computer system 130 can communicate with a content source 110 and a recipient 120. The computer system 130 is capable of supporting various computing services including, for instance, transcoding content data. In particular, the computer system 130 includes one or more processors, one or more memories storing computer-readable instructions for a route planning service, one or more network interfaces, and/or other computing components for communication with the content source 110 and the recipient 120. The computer system 130 may be a data center that includes multiple servers 132. Each server 132 can be implemented as hardware equipment or as a virtualized equipment executing on hardware equipment. In both cases, each server 132 is configured as a transcode server that execute transcode processes as parallel computing threads. The content source 110 can be a device capable of capturing live videos, such as a webcam associated with a user device. The recipient 120 may be a user device (e.g., mobile device, laptop, desktop, etc.) or an online service, such as a website at which live stream content can be output.

The computer system 130 receives live stream content data 112 from the content source 110. The live stream content data 112 may be transmitted and played using streaming techniques, in which portions of transmitted content are received and played while subsequent portions of the transmitted content are being transmitted. The term live streaming, as used herein, refers to scenarios in which video content of an event (e.g., a video game) may be transmitted to recipients, and at least part of the video content may be played while the event is still occurring (e.g., while the video game is still being played by the players), albeit with some a small amount of latency between the time that video content is captured and the time that the video is eventually played to viewers. For example, by operating the content source 110, a video game player may capture live stream video of themselves playing a video game. The content source 110 may then transmit this game video to the computer system 130. The computer system 130 may, in turn, transmit the game video to large quantities of recipients, including the recipient 120. The computer system 130 may transcode the live stream content data 112 by decoding the live stream content data 112 from a first format and then re-encoding it into a different format. The process of transcoding the live stream content data 112 may be performed by servers 132A-N of the computer system 130. The live streaming may involve a delay between the time when the content was initially generated by the content source 110 and/or received by the computer system 130 and the time when the processed content was sent from the computer system 130 and/or received by the recipient 120. Optimally, this delay is reduced or minimized and can be within a few milliseconds or a few seconds.

Upon receiving the live stream content data 112, the computer system 130 can cause a first server of the servers 132A-N to execute a first transcode process on at least a portion of the live stream content data 112. For instance, the computer system 130 can cause server 132A to execute the first transcode process to generate an output of first transcoded content. The computer system 130 may select server 132A based on a property (e.g., resolution, bitrate, etc.) of the live stream content data 112, and a second property of the transcoding. The second property of the transcoding can be a property (e.g., resolution, bitrate, frame rate, codec, etc. requested by the recipient 120). The server 132A determines that the first transcode process is associated with the first property and the second property and that the server 132A has a transcode capacity to execute the first transcode process. As part of a live stream, the computer system 130 sends the first transcoded content as transcoded content data 122 to the recipient 120, which has requested the live stream content.

At some point during the live stream, the computer system 130 can detect a trigger (e.g., a time period elapsing since the server 132A begins transcoding the live stream content data 112) for a potential re-allocation. It is a potential re-allocation and does either not occur or becomes an actual re-allocation depending on an optimization process. Once the trigger is detected, a transcode process optimizer 134 of the computer system 130 executes the optimization process and determines that transcoding the live stream content data 112 is to be moved to another server (e.g., server 132N) of the servers 132A-N. The transcode process optimizer 134 may receive a transcode capacity from each of the servers 132A-N and determine that the transcoding is to be moved to the server 132N based on the transcode capacity and a transcode optimization parameter (e.g., a per unit capacity). The computer system 130 can then cause the server 132N to execute a second transcode process on another portion of the live stream content data 112. The second transcode process can be the same as the first transcode process and can generate an output of second transcoded content. In addition, the computer system 130 can cause the server 132A to stop executing the first transcode process. As part of a live stream, the computer system 130 sends the second transcoded content as the transcoded content data 122 to the recipient 120. The recipient 120 can receive the transcoded content data 122 seamlessly, such that the re-locating of the transcoding from the server 132A to the server 132N is not noticeable by the recipient 120.

In an example, the transcode process optimizer 134 may include a machine learning model that is trained to determine movement of transcode process executions between the servers 132A-N based on one or more optimization parameters. The transcode capacity of the servers 132A-N, the property of the live stream content data 112, and/or the property of the transcoding can be input to the machine learning model, which can then output an indication of to which server the transcoding is to be moved. Historical data of previous live stream content data, properties of the previous live stream content data, properties of transcoded content data, and previous transcode capacities can be used to train the machine learning model. The historical data can be labeled with the optimal servers for the historical transcoding processes, so parameters of the machine learning model can be adjusted as the machine learning model minimizes a loss function between the optimal server and a recommended server.

Figure 2:
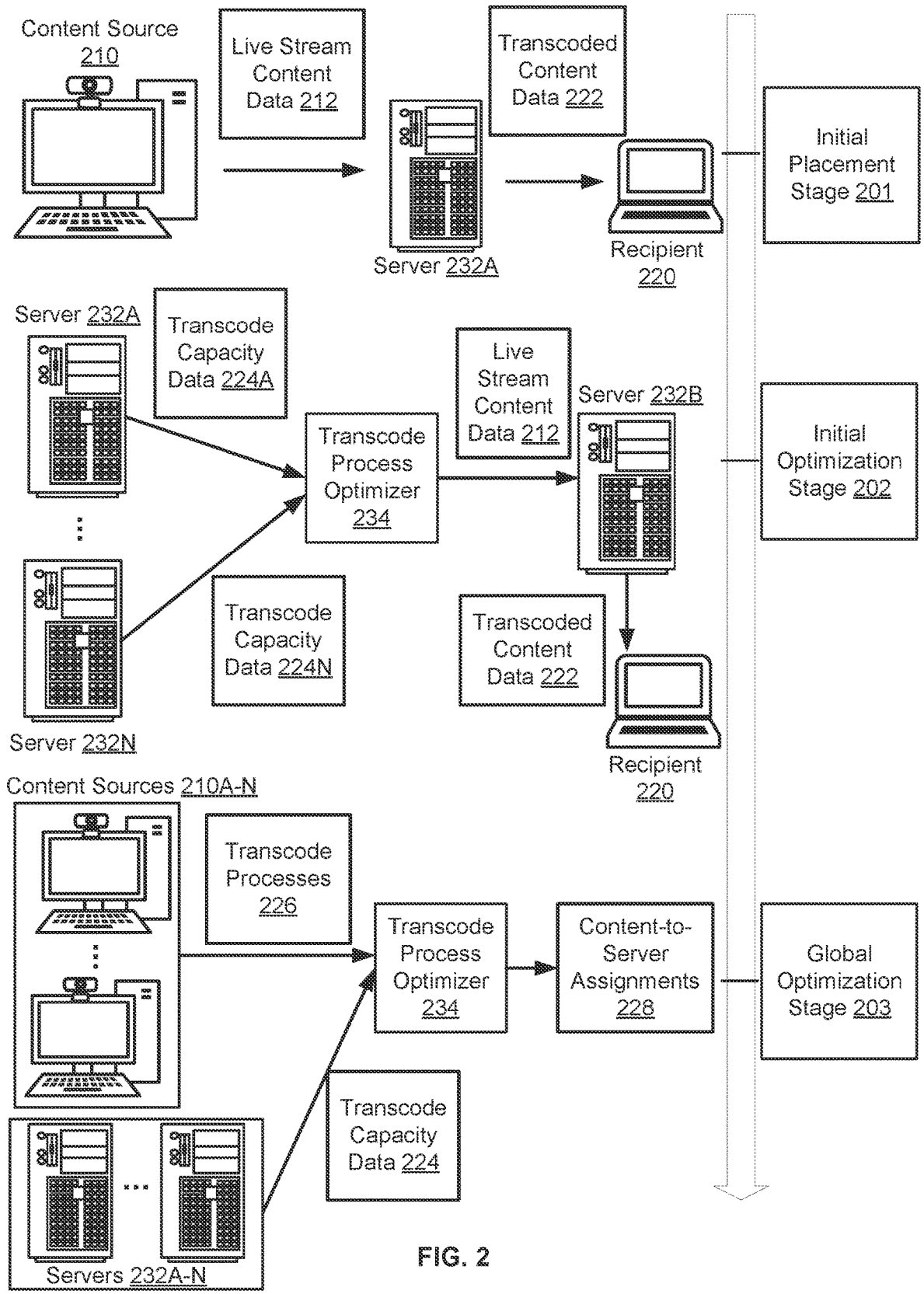
FIG. 2 illustrates an example flow diagram of stages of dynamically re-locating a transcoding process of live content data according to some embodiments.

FIG. 2 illustrates an example flow diagram of stages of dynamically re-locating a transcoding process of live content data according to some embodiments. The flow diagram includes an initial placement stage 201, an initial optimization stage 202, and a global optimization stage 203.

In an example, the initial placement stage 201 involves a server 232A transcoding live stream content data 212 received from a content source 210. The server 232A may determine one or more properties associated with the live stream content data 212 (e.g., actual properties of the live stream content data 212 and/or properties of an account under which the content source 210 is registered), and one or more properties that are to be associated with transcoded content data 222 of the live stream content data 212 (e.g., actual properties of the transcoded content data 222 and/or properties of an account(s) with which a recipient(s) 220 is(are) registered). The server 232A can also determine that the server 232A includes a transcode capacity for executing a transcode process that involves the properties of the live stream content data 212 and the properties of the transcoded content data 222. Upon determining that the server 232A includes the transcode capacity, the server 232A performs the transcode process to generate the transcoded content data 222. The server 232A can output the transcoded content data 222 to the recipient 220 that has requested the live stream content data 212. Of course, if multiple of such recipients have requested the live stream content data 212, the transcoded content data 222 is output to these recipients.

The initial optimization stage 202 involves a transcode process optimizer 234 executing an optimization process to determine whether to move the transcode process of the live stream content data 212 to a server other than the server 232A. The initial optimization stage 202 may be initiated based on a detection of a trigger. For instance, the trigger may be a time period elapsing since the server 232A begins transcoding the live stream content data 212. Other triggers may be a change to a number of transcoding processes being executed on the server 232A, a change to a property associated with the live stream content data 212, a change to a property of an output of the transcoding, a server maintenance for the server 232A, a change to a demand for viewing the live stream content data 212, or a periodic time trigger.

During the initial optimization stage 202, the transcode process optimizer 234 can receive transcode capacity data 224 from each of servers 2324A-N. For example, the transcode process optimizer 234 can receive transcode capacity data 224A from server 232A and transcode capacity data 224N from server 232N. The transcode process optimizer 234 can also receive a needed transcode capacity associated with executing the transcode process that involves the properties of the live stream content data 212 and the properties of the transcoded content data 222. The needed transcode capacity can be determined based on a property-capacity mapping. Based on the transcode capacity data 224 and the needed transcode capacity, the transcode process optimizer 234 can determine that the transcoding is to be moved to server 232B upon determining that server 232B includes the needed transcode capacity. In some examples, rather than the needed transcode capacity, the transcode process optimizer 234 may receive an indication of needed computing resources (e.g., central processing unit (CPU) utilization, graphical processing unit (GPU) utilization, memory utilization, network utilization, etc.) associated with executing the transcode process that involves the properties of the live stream content data 212 and the properties of the transcoded content data 222. Based on a determined available computing resources associated with the transcode capacity data 224 and the needed computing resource, the transcode process optimizer 234 can determine that the transcoding is to be moved to server 232B upon determining that server 232B includes the needed computing resources. The server 232B then executes the transcode process to transcode the live stream content data 212 into the transcoded content data 222, which is sent to the recipient 220.

The global optimization stage 203 can involve the transcode process optimizer 234 executing an optimization process that considers multiple ongoing transcode processes 226 and servers 232A-N to move the transcode processes 226 between the servers 232A-N. Each of the transcode processes 226 can be associated with live stream content from one content source of content sources 210A-N. The global optimization stage 203 may be initiated based on a detection of a trigger. For instance, the trigger may be a comparison between a transcode capacity across the servers 232A-N determined from the transcode capacity data 224 and a threshold capacity. Upon determining that the transcode capacity exceeds the threshold capacity, the global optimization stage 203 can be triggered. Other triggers for the global optimization stage 203 may be a change to a number of transcoding processes being executed on the servers 232A-N, a change to a property of the transcoding processes 226, or a periodic time trigger.

During the global optimization stage 203, the transcode process optimizer 234 can determine which transcode processes 226 are to be assigned to which server 232A-N. An optimization parameter used by the transcode process optimizer 234 may be a per unit capacity, or a ratio of a total capacity to the number of servers. So, the transcode process optimizer 234 can determine content-to-server assignments 228 that optimize the per unit capacity based on the properties of the transcode processes 226 and the transcode capacity data 224 for the servers 232A-N. The transcode process optimizer 234 can cause the content-to-server assignments 228 to be automatically implemented so that transcoded content is seamlessly output to the content sources 210A-N.

Figure 3:
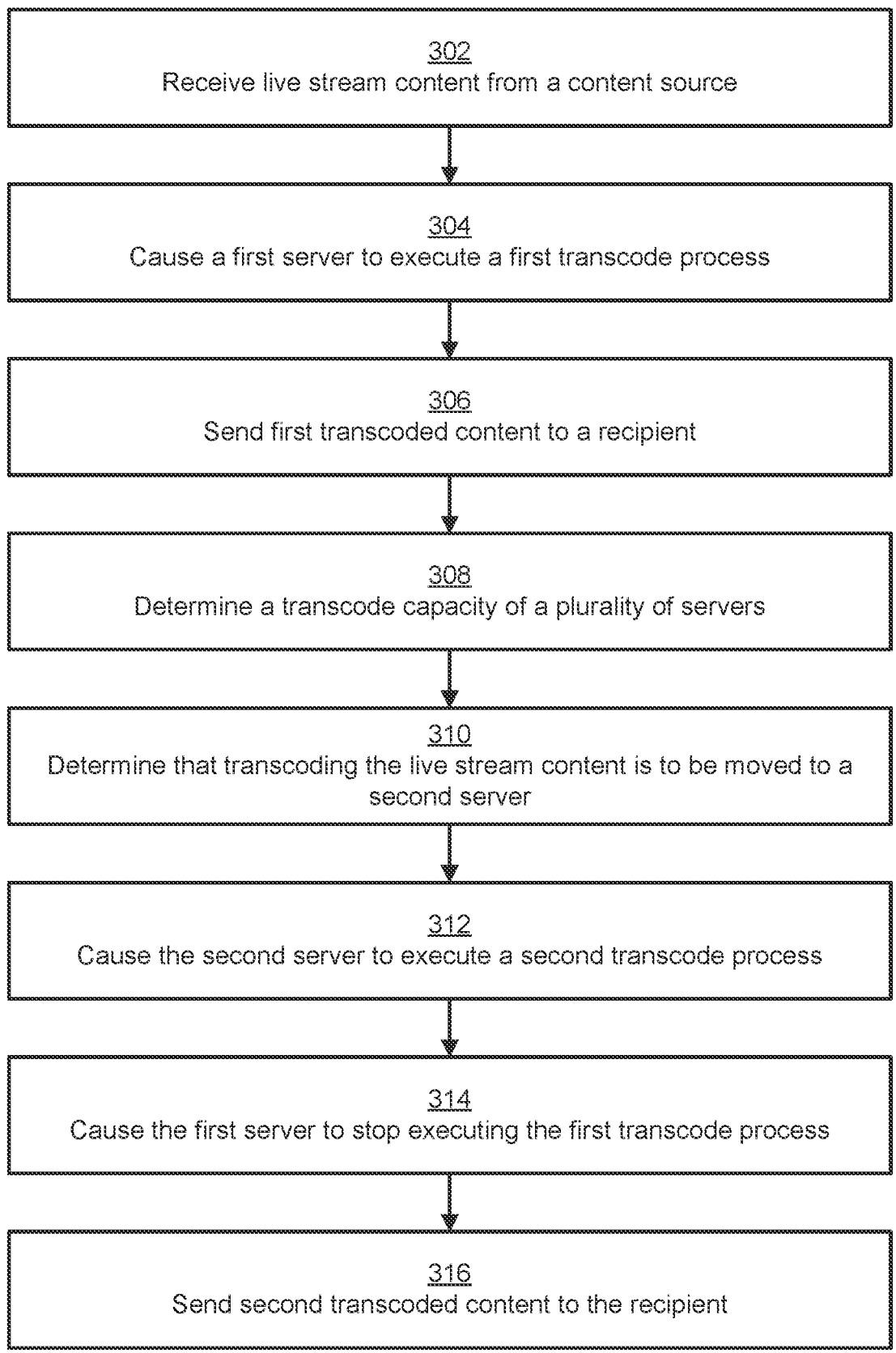
FIG. 3 illustrates an example flow of a process of dynamically re-locating a transcoding process of live content data according to some embodiments.

FIG. 3 illustrates an example flow of a process of dynamically re-locating a transcoding process of live content data according to some embodiments. Operations of the flow can be performed by a computer system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 302, where the computer system receives live stream content from a content source. The content source can be a device capturing audio and/or video of a live stream.

In an example, the flow includes operation 304, where the computer system causes a first server to execute a first transcode process. The first server may determine that it includes transcode capacity for the first transcode process based on properties of the live stream content and/or a transcoding of the live stream content. The first server can indicate to the computer system that is has the transcode capacity and the computer system can then cause the first server to execute the first transcode process. The first transcode process can be executed on a first portion of the live stream content. A first output of executing the first transcode process can be first transcoded content.

In an example, the flow includes operation 306, where the computer system sends first transcoded content to a recipient. The first transcoded content can be sent to the recipient as part of a live stream. The recipient can be a user device or an online service that has requested the live stream content.

In an example, the flow includes operation 308, where the computer system determines a transcode capacity of a plurality of servers. Each server of the plurality of servers can indicate their transcode capacity to the computer system. The transcode capacity may be determined in response to the computer system receiving a trigger.

In an example, the flow includes operation 310, where the computer system determines that transcoding the live stream content is to be moved to a second server. The computer system can execute an optimization process based on the transcode capacity and a transcode optimization parameter to determine that the transcoding is to be moved to the second server.

In an example, the flow includes operation 312, where the computer system causes the second server to execute a second transcode process. The second transcode process is executed on a second portion of the live stream content and the second transcode process is equivalent to the first transcode process. A second output of executing the second transcode process is second transcoded content.

In an example, the flow includes operation 314, where the computer system causes the first server to stop executing the first transcode process. The computer system can send a notification to the first server indicating that the first server is to stop executing the first transcode process. Or the computer system may remove the live stream content from a queue from which the first server is pulling the live stream content.

In an example, the flow includes operation 316, where the computer system sends second transcoded content to the recipient. The second transcoded content is sent to the recipient as part of the live stream.

Figure 4:
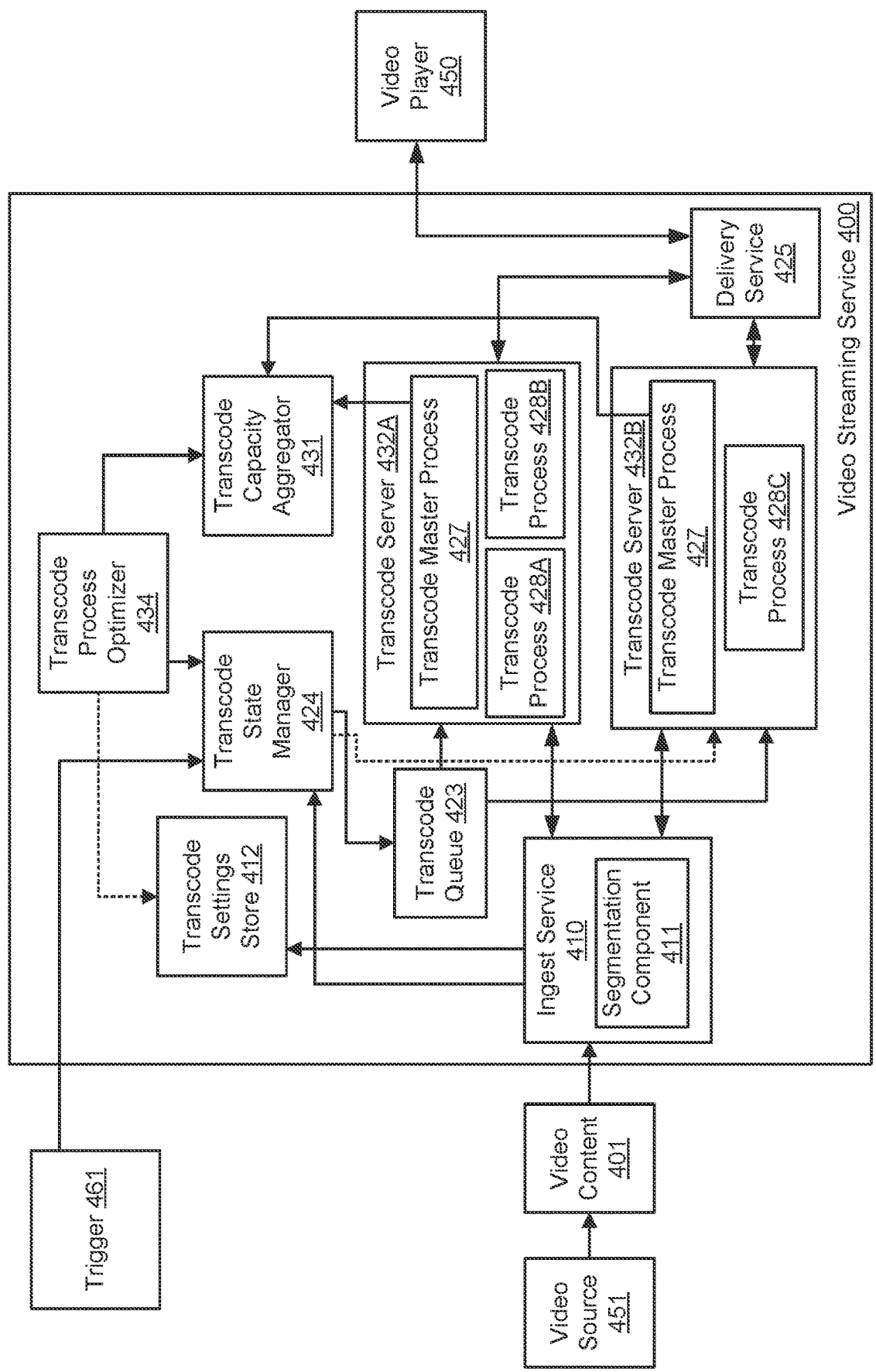
FIG. 4 is a diagram illustrating an example dynamic transcode relocation system according to some embodiments.

FIG. 4 is a diagram illustrating an example dynamic transcode relocation system according to some embodiments. Here, video-related processing is described. However, the system can be similarly used for processing other content types.

Video content 401 generated by a video source 451 may be received, at video streaming service 400, by an ingest service 410. The ingest service 410 may initiate video processing by calling a transcode state manager 424, for example via a call of an application programming interface (API) of the transcode state manager 424 (e.g., a create transcode API call). The ingest service 410 can probe the video content 401 to retrieve the video stream properties such as resolution and bitrate. The ingest service 410 also fetches the transcode settings from a transcode setting store 412 and feeds this information to the transcode state manager 424. In response to this call, the transcode state manager 424 may create an entry for the job of transcoding of the video content 401. This entry may include, for example, a transcode identifier (ID) for the job of transcoding video content 401, a stream ID for the video stream created by that job, a transcode server ID for the transcode server that performs the job, and other metadata. The transcode state manager 424 may also create job data, which is data associated with the job of the transcoding of the video content 401. The job data may be enqueued in transcode queue 423.

The video streaming service 400 may operate a transcode server pool, which may include transcode server 432A, transcode server 432B and optionally any number of other transcode servers (not shown in FIG. 4). The transcode servers in the transcode server pool may consume job data from the transcode queue 423. The transcode server 432A may produce video segments and playlists for video content 401 by performing transcode process 428A. Each transcode server includes a transcode master process 427 that monitors the state of all transcode processes 428A-C on the transcode server, pulls new transcode jobs to start, and sends capacity information to a transcode capacity aggregator 431.

The transcode servers 432A-B may determine and report their transcode capacity as a qualifier or as an amount of computing resources (GPU, CPU, network, memory, etc.). If the transcode servers 432A-B determine their transcode capacity as a qualifier, each transcode server can determine a number and type of transcode processes the transcode server is currently executing. For instance, the transcode server 432A may determine that it is currently executing two transcode processes for a mobile application in standard definition and one transcode process for a desktop application in high definition. There can be a property-to-capacity mapping for the transcode server 432A, which can be used to determine additional transcode processes that the transcode server 432A can execute. Each transcode server can store its own property-to-capacity mapping. The transcode server 432A can perform a lookup of a maximum capacity of the transcode server 432A and its property-to-capacity mapping to determine that available transcode capacity for the transcode server 432A is five more transcode processes for a mobile application in standard definition or for two more transcode processes for a desktop application in high definition. The available transcode capacity can be sent to the transcode capacity aggregator 431.

Alternatively, if the transcode servers 432A-B determine their transcode capacity as an amount of computing resources, each transcode server can determine their available computing resources. There can be a mapping between needed computing resources and properties of the video content 401 and the transcoding. So, the transcode server 432A can perform a lookup of a maximum capacity of the transcode server 432A and the mapping to determine the available computing resources. Based on the available computing resources and the mapping, the transcode server 432A can also determine whether the transcoder server 432A has transcode capacity for additional transcode processes. The available capacity can be sent to the transcode capacity aggregator 431.

In an example, rather than the transcode servers 432A-B determining the transcode capability, the transcode capacity aggregator 431 may be configured to perform the determination. In such examples, the transcode servers 432A-B can send information (e.g., either a qualifier of a number and type of the transcode processes or an amount of consumed computing resources) about the transcode processes that are currently executing on the transcode servers 432A-B, and the transcode capacity aggregator 431 can perform the lookup to determine the available transcode capacity for the transcode servers 432A-B.

In the example of FIG. 4, at some time during the transmission of video content 101, a trigger 461 is received at the transcode state manager 424. The trigger 461 is an indication to perform a transcode server switch for video content 401, which is an indication to move the job of transcoding video content 401 from transcode server 432A to a different transcode server. The trigger 461 may be received via an API call to the transcode state manager 424. The transcode state manager 424 may then generate new transcode job data for those jobs with indicators denoting that the job data is created for a switching request. The transcode capacity aggregator 431 receives capacity information and transcode information (e.g., input resolution, output resolution, codecs, etc.) from all transcode master processes 427 and exposes the state of the data-center to interested parties. The transcode capacity aggregator 431 sends the capacity information to a transcode process optimizer 434 that pulls the state of the transcoder servers, runs an optimization process to decide how to optimally place transcode jobs, and initiates moving transcode jobs accordingly. If processes are not packed optimally, the transcode servers 432A-B may have unused capacity which means the video streaming service 400 must purchase and run more transcoding servers overall than necessary to have capacity for viewer demand.

As shown in FIG. 4, the ingest service 410 includes a segmentation component 411 that divides the video content 401 into segments. The segmentation component 411 may generate segment metadata that may be sent, along with the video content 401, to transcode server 432A. The segment metadata may include segment start metadata tags. In particular, based on a segmentation algorithm, whenever the segmentation component 411 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 432A to process and output a corresponding segment sequence number and presentation timestamp later on.

In the example of FIG. 4, the switch job data is retrieved, from transcode queue 423, by transcode server 432B. Upon retrieval of the switch job data, transcode server 432B may start processing the video content 401 by fetching it from the ingest service 410. The transcode server 432B may then start producing the segments and playlists for the video content 401. The transcode server 422 may then notify the transcode state manager 424 that it is ready to take over the video delivery for the video content 401. Because this is a switch job, the transcode server 432B may wait until it has produced at least a full playlist of segments to send this notification to the transcode state manager 424. This may help to ensure a seamless switch from the transcode server 432A to the transcode server 432B, such as by ensuring that the video player 450 is not switched to transcode server 432B before the transcode server 432B has produced at least a full playlist of segments. The transcode state manager 424 may update a cloned entry for video content 401 to indicate that transcode server 432B is performing the transcode job for video content 401. It is noted that, while FIG. 4 shows only a single transcode queue 423, the video streaming service 400 may employ multiple queues, and the switch job data may sometimes be sent to, and retrieved from, a different queue than the job data.

Similar to transcode server 432A, transcode server 432B may also receive the segment metadata from the segmentation component 411 along with the video content 401. As described above, the segment metadata may include segment start metadata tags. In particular, based on a segmentation algorithm, whenever the segmentation component 411 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 432B to process and output a corresponding segment sequence number and presentation timestamp later on. The segment metadata, therefore, allows both transcode server 432A and transcode server 432B to connect to video content 401 and to produce aligned and synchronized segments and playlists. This allows seamless switching of the transcoding of video content 401 from transcode server 432A to transcode server 432B without interrupting playback of the video content

401. The segmentation component 411 may be external to the transcode servers 432A-B and may communicate with the transcode servers 432A-B, thereby allowing segmentation of the video content 401 to be aligned across the transcode servers 432A-B.

The video delivery service 425 may include a mapping, which may indicate which transcode servers 432A-B are producing which video streams. The mapping may be built as a cache whose mapping entries are refreshed at regular intervals, such as intervals of a selected number of minutes. The video delivery service 425 may request the transcode state manager 424 to provide the transcode server ID for a transcode server associated with a given video stream. The video delivery service 425 may then cache an entry in the mapping to associate the transcode server ID with the given video stream. As a specific example, for the video stream associated with video content 401, when the video delivery service 425 makes a request to the transcode state manager 424 after transcode server 432B is ready to produce segments and playlists for video content 401, the transcode server may provide the transcode server ID for transcode server 432B. The video delivery service 425 may then cache an entry in the mapping to associate the transcode server ID for transcode server 432B with the video stream for video content 401. Based on this entry in the mapping, the video delivery service 425 may fetch subsequent playlists and segments from transcode server 442B instead of transcode server 432A. The transcode state manager 424 may remove the initial transcode entry corresponding to the transcode server 432A, for example after waiting a selected time period from when it served the new transcode server information (i.e., the indication of the transcode server 432B) to the video delivery service 425. The removal of this initial transcode entry may signal the transcode server 432A to stop processing the video stream for video content 401.

FIGS. 5-8 illustrate example flows for processes associated with dynamically re-locating transcode processes of live content. Operations of the flows are described with respect to the components of FIG. 4. Operations of the flows can be performed by a video streaming service of a computer system, such as the video streaming service 400 of the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 5:
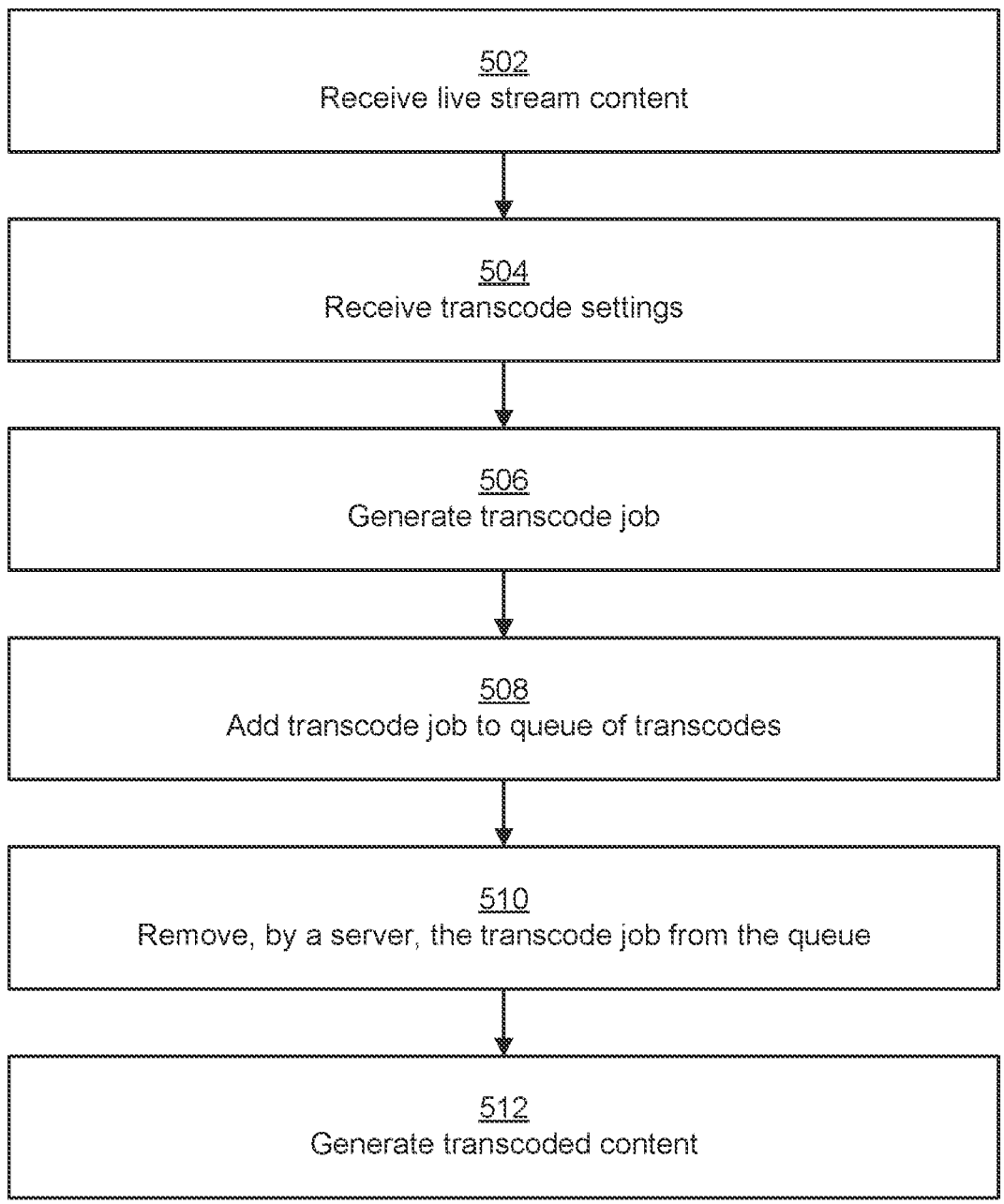
FIG. 5 illustrates an example flow of a process of initial placement of a transcode process to a server according to some embodiments.

FIG. 5 illustrates an example flow of a process of initial placement of a transcode process to a server according to some embodiments. In an example, the flow includes operation 502, where the video streaming service 400 receives live stream content (e.g., video content 401). The video content 401 is generated by a video source 451 and may be received by an ingest service 410 of the video streaming service.

In an example, the flow includes operation 504, where the video streaming service 400 receives transcode settings. The ingest service 410 can access a transcode setting store 412 to retrieve video stream properties such as resolution and bitrate for the video content 401.

In an example the flow includes operation 506, where the video streaming service 400 generates a transcode job. The transcode state manager 424 may create an entry for the job of transcoding of the video content 401. This entry may include, for example, a transcode ID for the job of transcoding video content 401, a stream ID for the video stream created by that job, a transcode server ID for the transcode server that performs the job, and other metadata. The transcode state manager 424 may also create job data, which is data associated with the job of the transcoding of the video content 401.

In an example, the flow includes operation 508, where the video streaming service 400 adds the transcode job to a queue of transcodes. The queue is stored in a transcode queue 423, which acts as a buffer for transcode jobs.

In an example, the flow includes operation 510, where the video streaming service 400 removes, by a server (e.g., transcode server 432A), the transcode job from the queue. The transcode server 432A can pull the transcode job from the transcode queue 423 based on determining that the transcoder server 432A has capacity for the transcode job.

In an example, the flow includes operation 512, where the video streaming service 400 generates transcoded content. The transcode server 432A executes a transcode process (e.g., transcode process 428A) to retrieve job data associated with the job of transcoding video content 401. The transcode server 432A may then processes the video content 401 to generate the transcoded content. The video player 450 requests the playlists and segments, and the video delivery service 425 calls the transcode server 432A to get the segments and playlists. The transcode server 432A may inform the transcode state manager 424 that it is performing the job of transcoding video content 401, and the transcode state manager 424 may update the entry for the job with a transcode server ID for transcode server 432A. In some examples, the transcode server 432A may inform the transcode state manager 424 that it is performing the job of transcoding video content 401 after the transcode server 432A has produced a full segment of the video content 401.

Figure 6:
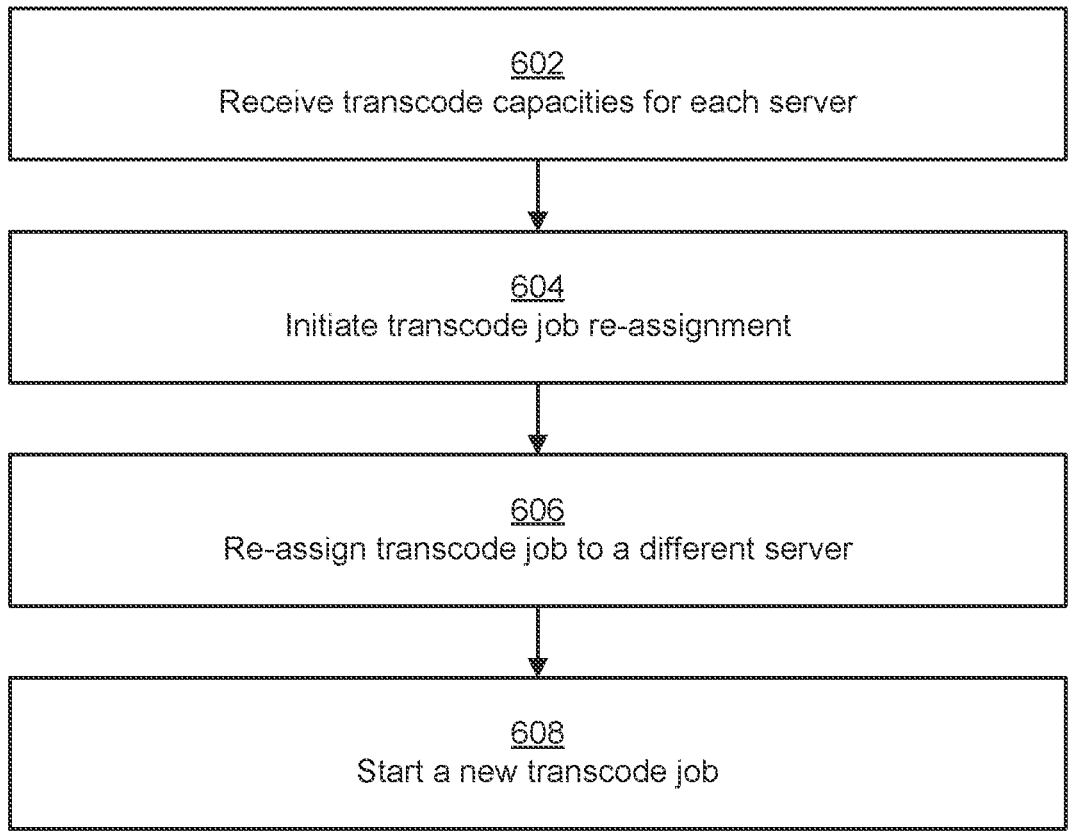
FIG. 6 illustrates an example flow of a process of a first optimization for placing a transcode process on a server according to some embodiments.

FIG. 6 illustrates an example flow of a process of a first optimization for placing a transcode process on a server according to some embodiments. In an example, the flow includes operation 602, where the video streaming service 400 receives transcode capacities for each server. For instance, a transcode capacity aggregator 431 receives the transcode capacities (e.g., either as a qualifier or as an amount of computing resources) from the transcode servers 432A-B and sends the transcode capacities to a transcode process optimizer 434. The transcode process optimizer 434 may receive the transcode capacities in response to a trigger 461. The trigger 461 may be based on a determination by one or more users, by software, or by some combination of both. In some examples, the trigger 461 may be based on a determination to temporarily, or permanently, remove transcode server 432A from operation. For example, in some cases, it may be desirable to remove transcode server 432A from operation, such as to upgrade firmware on the transcode server 432A, to better consolidate jobs among a smaller quantity of transcode servers, or for other reasons. As another example, the trigger 461 may be based on a determination to change to a video transcode configuration (e.g., preset, bitrate etc.) of video content 401 dynamically while transmitting. In one specific example, a user that provides the video content 401 may request to change a preset from fast to slow. In one scenario, the transcode server 432A may be incapable of supporting the slow preset, thereby requiring the use of a different transcode server that supports the slow preset. In another specific example, a user that provides the video content 401 may request to change a preset from slow to fast. In one scenario, a determination may be made to switch video content 401 from transcode server 432A (which may be capable of supporting both the slow and fast presets) to another transcode server (which may be capable of supporting the fast preset but not the slow present). This type of switch may be advantageous by freeing up transcode server 432A to take on other jobs requiring the slow preset.

In an example, the flow includes operation 604, where the video streaming service 400 initiates transcode re-assignment. The transcode process optimizer 434 can send an indication of the transcode server to which the transcode job is to be moved. For example, based on the transcode capacities, the transcode process optimizer 434 can determine that the transcode job for the video content 401 is to be moved to the transcode server 432B. So, the transcode process optimizer 434 can send an indication that the transcode job is to be moved to the transcoder server 432B. The transcode state manager 424 may create switch job data, which is data associated with the job of the transcoding of the video content 401 with an indicator denoting that the data is created for a switching request. The switch job data may be enqueued in the transcode queue 423. For examples in which the transcode server 432A is being removed from operation, the trigger 461 may include the transcode server ID for transcode server 432A and may indicate that the transcode server 432A is being removed from operation. The transcode state manager 424 may then signal the transcode server 432A to stop consuming transcode jobs from the transcode queue 423. The transcode state manager 424 may then identify, for example via a look-up in a data store, the video streams that are currently being processed by the transcode server 432A. The transcode state manager 424 may then clone the entries in the data store for those jobs. It is noted that, for scenarios in which only the transcoding of video content 401 is being switched (but the entire transcode server 423A is not being removed from operation), the switch job data may still be created and the corresponding entry in data store may be cloned, but there may be no need to perform these tasks for other transcode jobs that are performed by transcode server 432A.

In an example, the flow includes operation 606, where the video streaming service 400 re-assigns the transcode job to a different server. The transcode state manager 424 can indicate to a transcode master process 427 of the transcode server 432B that the transcode server 432B is to begin a transcode process 428C for the video content 401.

In an example, the flow includes operation 608, where the video streaming service 400 starts a new transcode job. The transcode server 432B can receive job data for transcoding the video content 401 from the transcode state manager 424 and execute the transcode process 428C to generate transcoded content of the video content 401. The transcoded content generated by the transcode process 428C is sent to a delivery service 425 for output to the video player 450.

Figure 7:
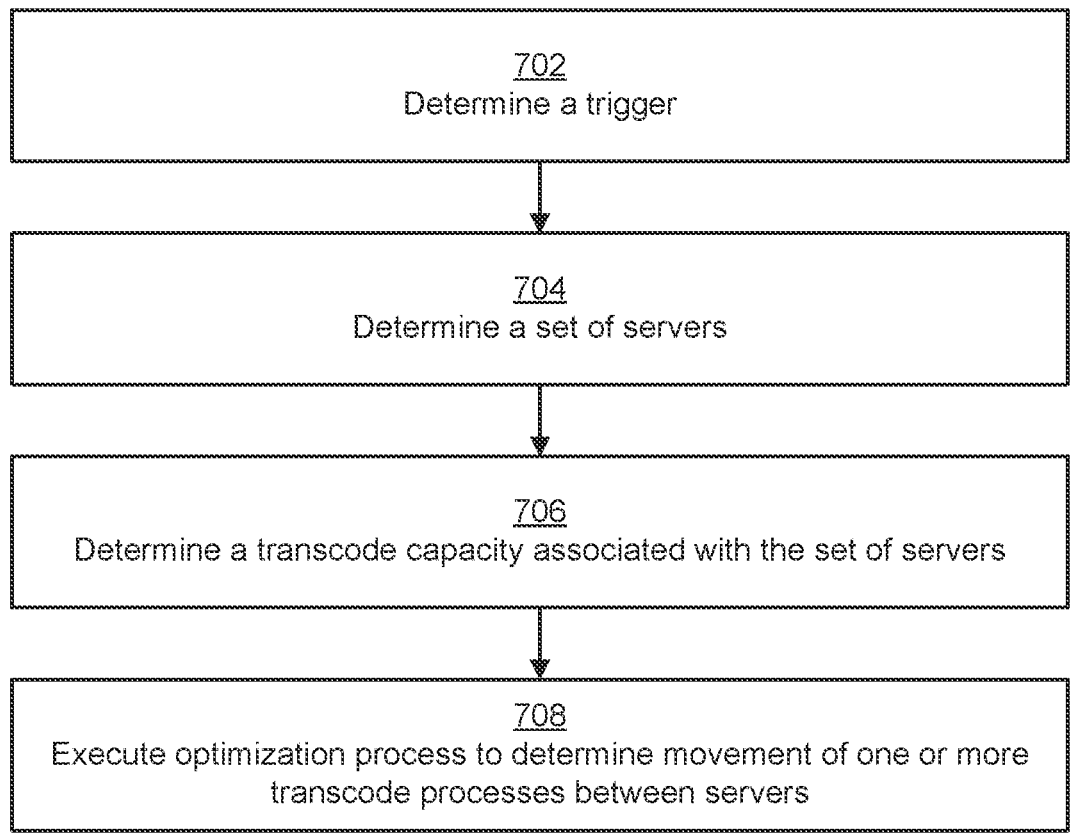
FIG. 7 illustrates an example flow for a process of a second optimization for placing multiple transcode processes on multiple servers according to some embodiments.

FIG. 7 illustrates an example flow for a process of a second optimization for placing multiple transcode processes on multiple servers according to some embodiments. In an example, the flow includes operation 702, where the video streaming service 400 determines a trigger 461. The trigger 461 may be a comparison between a transcode capacity across the transcode severs 432A-B received by a transcode capacity aggregator 431 and a threshold capacity.

Other examples of the trigger 461 may be a change to a number of transcoding processes 428 being executed on the servers 432A-B, a change to a property of the transcoding processes 428, or a periodic time trigger.

In an example, the flow includes operation 704, where the video streaming service 400 determines a set of servers. The set of servers can include one or more of the transcode servers 432A-B and additional transcode servers of the video streaming service 400. In some examples, the set of servers may include a subset of the transcode servers or all of the transcode servers. The sets can be predefined, or, depending on changes to the transcode capacities, the sets can be dynamically formed.

In an example, the flow includes operation 706, where the video streaming service 400 determines a transcode capacity (e.g., either as a qualifier or as an amount of computing resources) associated with the set of servers. A transcode process optimizer 434 can receive the transcode capacity for the set of servers from the transcode capacity aggregator 431. For examples in which the transcode servers are distributed between different sets of servers, there may be multiple transcode process optimizers that each receive the transcode capacity associated with one of the sets of servers.

In an example, the flow includes operation 708, where the video streaming service 400 executes an optimization process to determine movement of one or more transcode processes between the servers. Each of the one or more transcode process optimizers can execute the optimization process based on the transcode capacity of their associated set of servers and on an optimization parameter to determine which transcode processes are to be moved to which servers. For examples with multiple transcode process optimizers, the transcode process optimizers may each execute the optimization process in parallel. There may be instances in which one transcode process optimizer determines that a particular transcode process is be moved to a particular server and another transcode process optimizer determines that the same transcode process is to be moved to a different server. So, the video streaming service 400 may impose a constraint on the movement of transcode processes. For instance, the constraint may be time-based, where once a transcode process is moved, the same transcode process cannot be moved again until a timer that is started when the transcode process is moved elapses. Or, the constraint may be execution-based, where if a transcode process is considered by one transcode process optimizer, the same transcode process cannot be considered by another transcode process optimizer. As a further example, the constraint may be result-based constraint, where two transcode process optimizers determine that a same transcode process is to be moved to different servers, and, based on the determined servers, one of the servers is selected.

Figure 8:
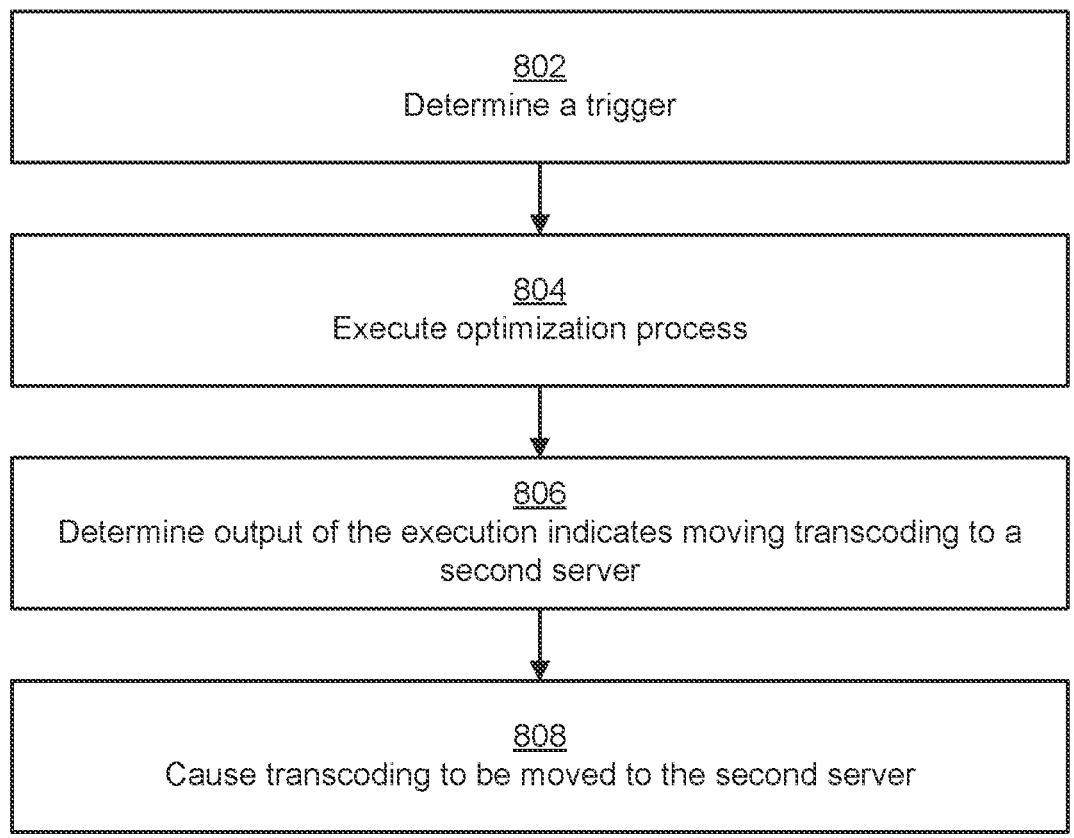
FIG. 8 illustrates an example flow of a process of re-locating a transcode process to a server according to some embodiments.

FIG. 8 illustrates an example flow of a process of re-locating a transcode process to a server according to some embodiments. The transcode process can be a transcoding of video content 401 that is initially performed on a first server (e.g., transcode server 432A). In an example, the flow includes operation 802, where the video streaming service 400 determines a trigger 461. The trigger 461 may be a server maintenance, a change to a property of the video content 401 or the transcoding, or a change to a demand for viewing the video content 401.

In an example, the flow includes operation 804, where the video streaming service 400 executes an optimization process. The optimization process involves a transcode process optimizer 434 receiving a transcode capacity (e.g., either as a qualifier or as an amount of computing resources) of transcode servers associated with the video streaming service 400. The transcode process optimizer 434 receives the transcode capacity and the properties associated with the video content 401 and the transcoding.

In an example, the flow includes operation 806, where the video streaming service 400 determines an output of the execution indicates moving the transcoding to a second server (e.g., transcode server 432B). The transcode process optimizer 434, determines, based on the transcode capacity, the properties, and an optimization parameter, that the transcoding is to be moved to the second server. A transcode state manager 424 receives the output indicating that the transcoding is to be moved.

In an example, the flow includes operation 808, where the video streaming service 400 causes the transcoding to be moved to the second server. The transcode state manager 424 can send the video content 401 to the second server upon determining that the transcoding is to be moved to the second server. The second server can then perform another transcode process for the video content 401 and send transcoded content to a video player 450.

Figure 9:
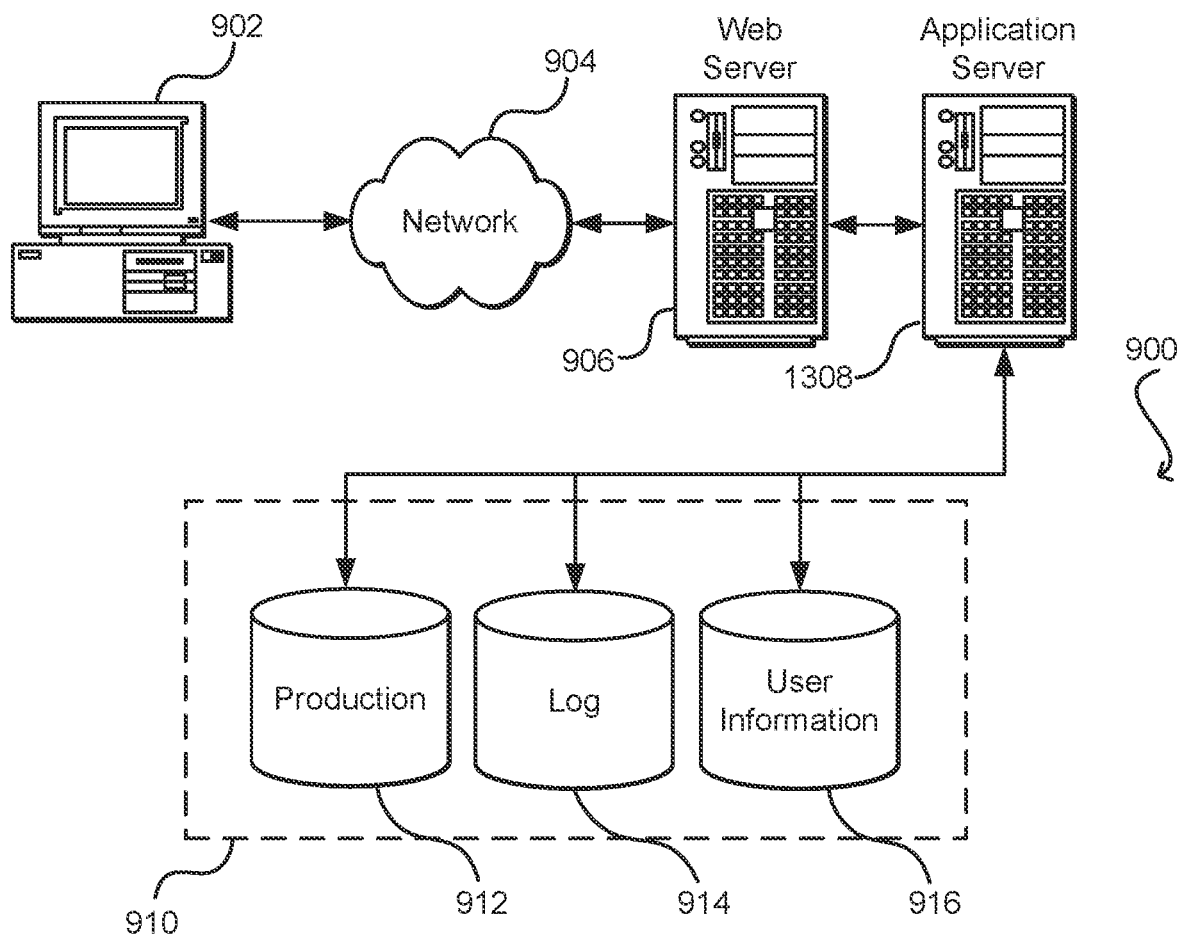
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902 (e.g., an example of the content source 110 and/or the recipient 120), which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a plurality of servers each configured to execute one or more transcode processes;
   one or more processors; and
   one or more memory storing instructions that, upon execution by the one or more processors, configure the system to:
   receive live stream content from a content source;
   cause a first server of the plurality of servers to execute a first transcode process on a first portion of the live stream content, a first output of executing the first transcode process comprising first transcoded content;
   send, as part of a live stream, the first transcoded content to a recipient that has requested the live stream content;
   determine a transcode capacity of the plurality of servers;
   determine, based at least in part on a first execution of a first optimization process, that transcoding the live stream content is to be moved to a second server of the plurality of servers based at least in part on the transcode capacity and a transcode optimization parameter, the first execution being based at least in part on a first trigger associated with the first transcode process;
   cause the second server to execute a second transcode process on a second portion of the live stream content, the second transcode process being equivalent to the first transcode process, a second output of executing the second transcode process comprising second transcoded content;
   cause the first server to stop executing the first transcode process based at least in part on the second transcode process being executed;
   send, as part of the live stream, the second transcoded content to the recipient; and
   execute, based at least in part on a second trigger associated with a plurality of transcode processes, a second optimization process configured to move execution of one or more transcode processes between the plurality of servers subject to a constraint, wherein the constraint indicates that moving the transcoding of the live stream content is prohibited for a time period.

2. The system of claim 1, wherein causing the first server to execute the first transcode process comprises:
   indicating, to the plurality of servers, that the live stream content is received, a first property of the live stream content, and a second property of the transcoding, wherein the first server is configured to execute the first transcode process based at least in part on a determination by the first server that (i) the first transcode process is associated with the first property and the second property and (ii) the first server has a first transcode capacity to execute the first transcode process.

3. The system of claim 2, wherein the time period is a first time period, and wherein the one or more memory store additional instructions that, upon execution by the one or more processors, configure the system to:
   receive, from the first server, an indication that the first server is transcoding the live stream content;
   determine that a second time period has elapsed since the indication was received, wherein the first trigger includes a time trigger corresponding to an elapse of the second time period; and
   execute, based at least in part on the second time period having elapsed, the first optimization process, wherein a third output of executing the first optimization process indicates that the transcoding is to be moved to the second server, and wherein the third output is generated based at least in part on the transcode capacity being input to the first optimization process.

4. The system of claim 1, wherein the one or more memory store additional instructions that, upon execution by the one or more processors, configure the system to:
   compare the transcode capacity to a threshold capacity; and
   execute, based at least in part on the comparison, the first optimization process, wherein a third output of executing the first optimization process indicates that the transcoding is to be moved to the second server.

5. A computer-implemented method comprising:
   causing a first server to execute a first transcode process on a first portion of live stream content from a content source, a first output of executing the first transcode process comprising first transcoded content, the live stream content corresponding to a live stream to a recipient;

determining a transcode capacity of one or more servers;
determining, based at least in part on a first execution of a first optimization process, that transcoding the live stream content is to be moved to a second server based at least in part on the transcode capacity and a transcode optimization parameter, the first execution based at least in part on a first trigger associated with the first transcode process;
causing the second server to execute a second transcode process on a second portion of the live stream content, the second transcode process being equivalent to the first transcode process, a second output of executing the second transcode process comprising second transcoded content; and
executing, based at least in part on a second trigger associated with a plurality of transcode processes, a second optimization process configured to move execution of one or more transcode processes between servers subject to a constraint, wherein the constraint indicates that moving the transcoding of the live stream content is prohibited for a time period.

6. The computer-implemented method of claim 5 further comprising:
receiving the live stream content from the content source;
sending, as part of the live stream, the first transcoded content to the recipient that has requested the live stream content;
causing the first server to stop executing the first transcode process based at least in part on the second transcode process being executed; and
sending, as part of the live stream, the second transcoded content to the recipient.

7. The computer-implemented method of claim 5 further comprising:
receiving, from the first server, first data indicating a first capacity available at the first server for content transcoding; and
receiving, from the second server, second data indicating a second capacity available at the first server for content transcoding, wherein the transcode capacity is based at least in part on the first data, the second data, and a number of servers available for content transcoding.

8. The computer-implemented method of claim 5, wherein the time period is a first time period, and further comprising:
receiving, from the first server, an indication a start of the transcoding of the live stream content by the first server;
determining the first trigger to execute the first optimization process, the first trigger comprising at least one of: an elapse of a second time period from the start of the transcoding, a change to a number of transcoding processes being executed on the second server, a change to a property of the live stream content, a change to a property of an output of the transcoding, or a periodic time trigger; and
executing the first optimization process, wherein an output of the executing of the first optimization process indicates that the transcoding is to be moved to the second server.

9. The computer-implemented method of claim 5 further comprising:
determining a first set of servers that includes the first server and the second server, wherein the transcode capacity is a first transcode capacity associated with the first set of servers;
executing the first optimization process for the first set of servers, wherein the first optimization process is executed based at least in part on the first transcode capacity and the transcode optimization parameter, and wherein a first output of the executing of the first optimization process indicates that the transcoding is to be moved to the second server;
determining a second set of servers that that is different from the first set of servers; and
executing the second optimization process for the second set of servers, wherein the second optimization process is executed based at least in part on a second transcode capacity associated with the second set of servers and on the transcode optimization parameter, and wherein a second output of the executing of the second optimization process indicates that another live content stream transcoding is to be moved to a third server of the second set.

10. The computer-implemented method of claim 5 further comprising:
determining a first property of the live stream content;
determining a second property of the transcoding of the live stream content;
determining, based at least in part on a property-capacity mapping, a needed transcode capacity that is associated with the first property and the second property; and
executing the first optimization process, wherein an input to the first optimization process comprises the transcode capacity of the one or more servers and the needed transcode capacity, and wherein an output of the executing of the first optimization process indicates that the transcoding is to be moved to the second server.

11. The computer-implemented method of claim 5 further comprising:
determining a first property of the live stream content;
determining a second property of the transcoding of the live stream content;
determining needed computing resources associated with the first property and the second property;
determining available computing resources associated with the transcode capacity; and
executing the first optimization process, wherein an input to the first optimization process indicates the needed computing resources and the available computing resources, and wherein an output of the executing of the first optimization process indicates that the transcoding is to be moved to the second server.

12. The computer-implemented method of claim 5 further comprising:
starting a timer based at least in part on the transcoding of the live stream content being moved to the second server, wherein further moving the transcoding to another server is prohibited for a duration of the timer.

13. The computer-implemented method of claim 5 further comprising:
executing the first optimization process, wherein a first output of the executing of the first optimization process indicates that the transcoding of the live stream content is to be moved to the second server, wherein the second optimization process is executed after the first optimization process is executed.

14. One or more computer-readable media storing instructions that, upon execution on a system, cause the system to perform operations comprising:
causing a first server to execute a first transcode process on a first portion of live stream content from a content source, a first output of executing the first transcode process comprising first transcoded content, the live stream content corresponding to a live stream to a recipient;

determining a transcode capacity of one or more servers;

determining, based at least in part on a first execution of a first optimization process, that transcoding the live stream content is to be moved to a second server based at least in part on the transcode capacity and a transcode optimization parameter, the first execution based at least in part on a first trigger associated with the first transcode process;

causing the second server to execute a second transcode process on a second portion of the live stream content, the second transcode process being equivalent to the first transcode process, a second output of executing the second transcode process comprising second transcoded content; and executing, based at least in part on a second trigger associated with a plurality of transcode processes, a second optimization process configured to move execution of one or more transcode processes between servers subject to a constraint, wherein the constraint indicates that moving the transcoding of the live stream content is prohibited for a time period.

15. The one or more computer-readable media of claim 14 storing further instructions that, upon execution on the system, cause the system to perform additional operations comprising:

generating content segments from the live stream content, wherein the first portion of the live stream content comprises a first set of the content segments, and wherein the second portion of the live stream content comprises a second set of the content segments;

generating data indicating that the first set of the content segments are transcoded by the first server and that the second set of the content segments are transcoded by the second server; and sending, as part of a live stream and based at least in part on the data, the first transcoded content and the second transcoded content to a recipient that has requested the live stream content.

16. The one or more computer-readable media of claim 14 storing further instructions that, upon execution on the system, cause the system to perform additional operations comprising:

generating, based at least in part on the transcode capacity, an input to a machine learning model, wherein the machine learning model is trained to determine movement of transcode process executions between servers based at least in part on the transcode optimization parameter; and determining an output of the machine learning model corresponding to the input, wherein the output indicates that the transcoding of the live stream content is to be moved to the second server.

17. The one or more computer-readable media of claim 16 wherein the input to the machine learning model is generated further based at least in part on a first property of the live stream content and a second property of the transcoding.

18. The one or more computer-readable media of claim 14 storing further instructions that, upon execution on the system, cause the system to perform additional operations comprising:

determining the first trigger to execute the first optimization process, wherein the first trigger is a time-based trigger; and executing the first optimization process, wherein an output of the executing of the first optimization process indicates that the transcoding is to be moved to the second server.

19. The one or more computer-readable media of claim 14 storing further instructions that, upon execution on the system, cause the system to perform additional operations comprising:

determining the first trigger to execute the first optimization process, wherein the first trigger comprises a change to a property of at least one of the live stream content or the transcoding; and executing the first optimization process, wherein an output of the executing of the first optimization process indicates that the transcoding is to be moved to the second server.

20. The one or more computer-readable media of claim 14 storing further instructions that, upon execution on the system, cause the system to perform additional operations comprising:

determining the first trigger to execute the first optimization process, wherein the first trigger comprises a change to a demand for viewing the live stream content; and executing the first optimization process, wherein an output of the executing of the first optimization process indicates that the transcoding is to be moved to the second server.

* * * * *